(12) United States Patent
Jellis

(10) Patent No.: US 9,854,938 B2
(45) Date of Patent: Jan. 2, 2018

(54) GRILL AND ROTISSERIE APPARATUS

(71) Applicant: Don Jellis, Watertown, SD (US)

(72) Inventor: Don Jellis, Watertown, SD (US)

( * ) Notice: Subject to any disclaimer, the term of this patent is extended or adjusted under 35 U.S.C. 154(b) by 22 days.

(21) Appl. No.: 14/727,077

(22) Filed: Jun. 1, 2015

(65) Prior Publication Data

US 2015/0374170 A1  Dec. 31, 2015

Related U.S. Application Data

(60) Provisional application No. 62/005,722, filed on May 30, 2014.

(51) Int. Cl.
*A47J 37/04* (2006.01)
*A47J 37/07* (2006.01)
*A47J 37/06* (2006.01)
*F24C 15/16* (2006.01)

(52) U.S. Cl.
CPC .......... *A47J 37/041* (2013.01); *A47J 37/042* (2013.01)

(58) Field of Classification Search
CPC ........ A47J 37/04; A47J 37/041; A47J 37/042; A47J 37/047
USPC .......... 99/419, 421 H, 421 HH, 421 P, 443 R
See application file for complete search history.

(56) References Cited

U.S. PATENT DOCUMENTS

| | | | |
|---|---|---|---|
| D158,712 S | 5/1950 | Breneman | |
| D158,838 S | 6/1950 | Caldwell | |
| D189,569 S | 1/1961 | Breneman | |
| 3,633,491 A * | 1/1972 | Williams, Jr. | F24C 15/164 99/340 |
| 3,941,968 A | 3/1976 | MacMaster et al. | |
| D255,314 S | 6/1980 | Huff | |
| D279,583 S | 7/1985 | Hall | |
| 4,561,418 A * | 12/1985 | Cairns | A47J 37/0688 126/25 A |
| 4,867,051 A * | 9/1989 | Schalk | A47J 37/0713 198/797 |
| 4,882,985 A * | 11/1989 | Beller | A47J 37/0745 126/25 R |
| 4,918,660 A * | 4/1990 | Perrot | A47J 37/047 220/213 |
| D336,752 S | 6/1993 | Lattimer | |
| D353,071 S | 12/1994 | Roberts | |
| D365,495 S | 12/1995 | O'Higgins | |
| D368,829 S | 4/1996 | Giebel et al. | |
| 5,598,769 A * | 2/1997 | Luebke | A47J 37/042 99/395 |

(Continued)

*Primary Examiner* — Dana Ross
*Assistant Examiner* — Lindsey C Staubach
(74) *Attorney, Agent, or Firm* — Patterson Thuente Pedersen P.A.

(57) ABSTRACT

A rotisserie arrangement mounts above the heat source of a grill. The rotisserie includes a plurality of holding devices configured to receive a flat meat item such as a steak or burger patty. The holding devices are spaced apart and rotatably coupled around the periphery of a vertically mounted wheel that is rotated by a power source. As the wheel rotates, the holding devices are passed over the heat source in succession. Further, two turning rollers are mounted adjacent the periphery of the wheel and spaced apart 180 degrees about the circumference of the wheel. As each holding device passes each turning roller, a projection on the holding device contacts the turning roller and causes the holding device to rotate one-quarter turn relative to the wheel.

18 Claims, 8 Drawing Sheets

(56) References Cited

U.S. PATENT DOCUMENTS

| | | |
|---|---|---|
| D468,963 S | 1/2003 | Pai |
| D470,721 S | 2/2003 | Home |
| D483,983 S | 12/2003 | Harrod et al. |
| D501,116 S | 1/2005 | Zhang |
| D503,066 S | 3/2005 | Militi |
| D508,368 S | 8/2005 | Lion et al. |
| D521,710 S | 5/2006 | Goldschmidt |
| D534,767 S | 1/2007 | Tseng |
| D543,775 S | 6/2007 | Orr, Jr. |
| D544,753 S | 6/2007 | Tseng |
| D546,116 S | 7/2007 | Tseng |
| D546,616 S | 7/2007 | Tseng |
| D548,007 S | 8/2007 | Chung |
| D553,430 S | 10/2007 | Williams et al. |
| D560,417 S | 1/2008 | Ho et al. |
| D566,456 S | 4/2008 | Profitt |
| D569,168 S | 5/2008 | Pai |
| D570,154 S | 6/2008 | Wang |
| D581,207 S | 11/2008 | Leavens et al. |
| D586,609 S | 2/2009 | Chau |
| D589,749 S | 4/2009 | Leavens et al. |
| D614,433 S | 4/2010 | Leavens |
| D635,814 S | 4/2011 | Leavens |
| 2005/0133018 A1 | 6/2005 | Spangrud |
| 2007/0102418 A1* | 5/2007 | Swank .............. A21B 3/02 219/400 |
| 2008/0017185 A1 | 1/2008 | Lee |
| 2008/0210217 A1 | 9/2008 | Offredi |
| 2009/0071465 A1 | 3/2009 | Leavens et al. |
| 2009/0078246 A1 | 3/2009 | Leavens et al. |
| 2011/0056477 A1 | 3/2011 | Leavens |
| 2012/0037012 A1* | 2/2012 | Stier .............. A47J 37/041 99/421 H |
| 2014/0216271 A1* | 8/2014 | Arling .............. A47J 37/041 99/421 H |

* cited by examiner

GRILL AND ROTISSERIE APPARATUS

RELATED APPLICATION

The present application claims the benefit of U.S. Provisional Application No. 62/005,722, filed May 30, 2014, said Application being hereby fully incorporated herein in its entirety by reference.

FIELD OF THE INVENTION

The present invention relates to barbeque grills, and more specifically to rotisseries for barbeque grills.

BACKGROUND OF THE INVENTION

A common problem in cooking meat such as steaks and burgers on a grill is that the meat cooks unevenly. This can be a particular problem when the steak or burger is not turned over at the proper times. Moreover, when meat is placed on a grate directly over the heat source, the intense heat can cause the meat to become dry.

Various rotisserie arrangements have been developed over the years to rotate or otherwise move meat relative to the heat source to in order to improve the evenness of cooking A drawback of these prior rotisserie arrangements, however, is that they generally do not adequately turn the meat for proper cooking, especially in the case of flat items such as steaks and burgers. What is needed is a grill and rotisserie arrangement that addresses the drawbacks of prior devices.

SUMMARY OF THE INVENTION

Embodiments of the present invention address the drawbacks of prior grill and rotisserie arrangements. According to an embodiment of the invention, a rotisserie arrangement mounts above the heat source of a grill. The rotisserie includes a plurality of holding devices configured to receive a flat meat item such as a steak or burger patty. The holding devices are spaced apart and rotatably coupled around the periphery of a vertically mounted wheel that is rotated by a power source. As the wheel rotates, the holding devices are passed over the heat source in succession. Further, two turning rollers are mounted adjacent the periphery of the wheel and spaced apart 180 degrees about the circumference of the wheel. As each holding device passes each turning roller, a projection on the holding device contacts the turning roller and causes the holding device to rotate one-quarter turn relative to the wheel. As a result, the rotisserie causes the meat to approach the heat source on one side and then the other on successive rotations of the wheel, so as to improve the evenness of cooking Moreover, the holding devices can be arranged about the circumference of the wheel so as to be vertically registered, thereby enabling the juices from the meat in the upper holding devices to drip onto the meat in the lower holding devices as wheel rotates, and thereby inhibiting drying out of the meat.

In an embodiment, a grill for cooking food items includes a heat source, and a rotisserie disposed above the heat source. The rotisserie includes a substantially circular wheel rotatable about a horizontal axis, the wheel having a periphery, a pair of turning structures mounted proximate the periphery of the wheel, the turning structures spaced apart by 180 degrees of rotation of the wheel, a power source operably coupled to the wheel and arranged to rotate the wheel about the horizontal axis, and a plurality of food holding devices rotatably coupled to the wheel proximate the periphery of the wheel. The rotation of each food holding device is about a horizontal axis parallel to the horizontal axis of the wheel, and each food holding device has a plurality of radially projecting tines, wherein when the wheel is rotated by the power source, the tines of the food holding devices successively engage the turning structures so as to rotate each food holding device one-quarter turn relative to the horizontal axis of the food holding device for each time the food holding device passes one of the turning structures.

In embodiments of the invention, the turning structures may be rollers. The power source may be an electric motor.

In embodiments of the invention, the food holding structures include a basket and a lid, the lid being operably coupled to the basket. The grill can include a housing with an opening on one side thereof, and a selectively shiftable door operably coupled thereto to close the opening. The door may be a downwardly swinging door assembly.

In embodiments of the invention, the wheel presents a plurality of device holding pins, and wherein each of the food holding devices is detachably engaged with a separate one of the device holding pins.

In embodiments of the invention, a rotisserie apparatus for mounting over a heat source to cook food items includes a housing and a substantially circular wheel mounted in the housing.

The wheel is rotatable about a horizontal axis and has a periphery. A pair of turning structures is mounted on the housing proximate the periphery of the wheel, the turning structures spaced apart by 180 degrees of rotation of the wheel. A power source is operably coupled to the wheel and arranged to rotate the wheel about the horizontal axis. A plurality of food holding devices is rotatably coupled to the wheel proximate the periphery of the wheel, rotation of each food holding device being about a horizontal axis parallel to the horizontal axis of the wheel. Each food holding device has a plurality of projections, wherein when the wheel is rotated by the power source, the projections of the food holding devices successively engage the turning structures so as to rotate each food holding device relative to the horizontal axis of the food holding device each time the food holding device passes one of the turning structures.

In embodiments of the invention, the turning structures are rollers. In embodiments of the invention, the power source is an electric motor.

In embodiments of the invention, the food holding structures comprise a basket and a lid, the lid being operably coupled to the basket.

In embodiments of the invention, the housing has an opening on one side thereof, and a selectively shiftable door operably coupled thereto to close the opening. The shiftable door may be a downwardly swinging door assembly. The wheel may present a plurality of device holding pins, and wherein each of the food holding devices is detachably engaged with a separate one of the device holding pins.

In embodiments of the invention, a grill for cooking food items, includes a heat source, and a rotisserie disposed above the heat source. The rotisserie includes a housing, a substantially circular wheel in the housing. The wheel is rotatable about a horizontal axis, and the wheel has a periphery. A plurality of turning structures is mounted proximate the periphery of the wheel. A power source is operably coupled to the wheel and is arranged to rotate the wheel about the horizontal axis. A plurality of food holding devices is rotatably coupled to the wheel proximate the periphery of the wheel, the rotation of each food holding device is about a horizontal axis parallel to the horizontal axis of the wheel, and each food holding device has a plurality of radially projecting tines, wherein when the wheel is rotated by the power source, the tines of the food holding devices successively engage the turning structures so as to rotate each food holding device relative to the horizontal axis of the food holding device for each time the food holding device passes one of the turning structures.

In embodiments of the invention, the turning structures are spaced apart by 180 degrees of rotation of the wheel.

In embodiments of the invention, the food holding device has four tines arranged in a cruciform shape. The food holding structures may include a basket and a lid, the lid being operably coupled to the basket.

In embodiments of the invention the housing has an opening on one side thereof, and a selectively shiftable door operably coupled thereto to close the opening. The selectively shiftable door may be a downwardly swinging door assembly.

BRIEF DESCRIPTION OF THE DRAWINGS

The invention can be understood in consideration of the following detailed description of various embodiments of the invention in connection with the accompanying drawings, in which.

Figure 1:
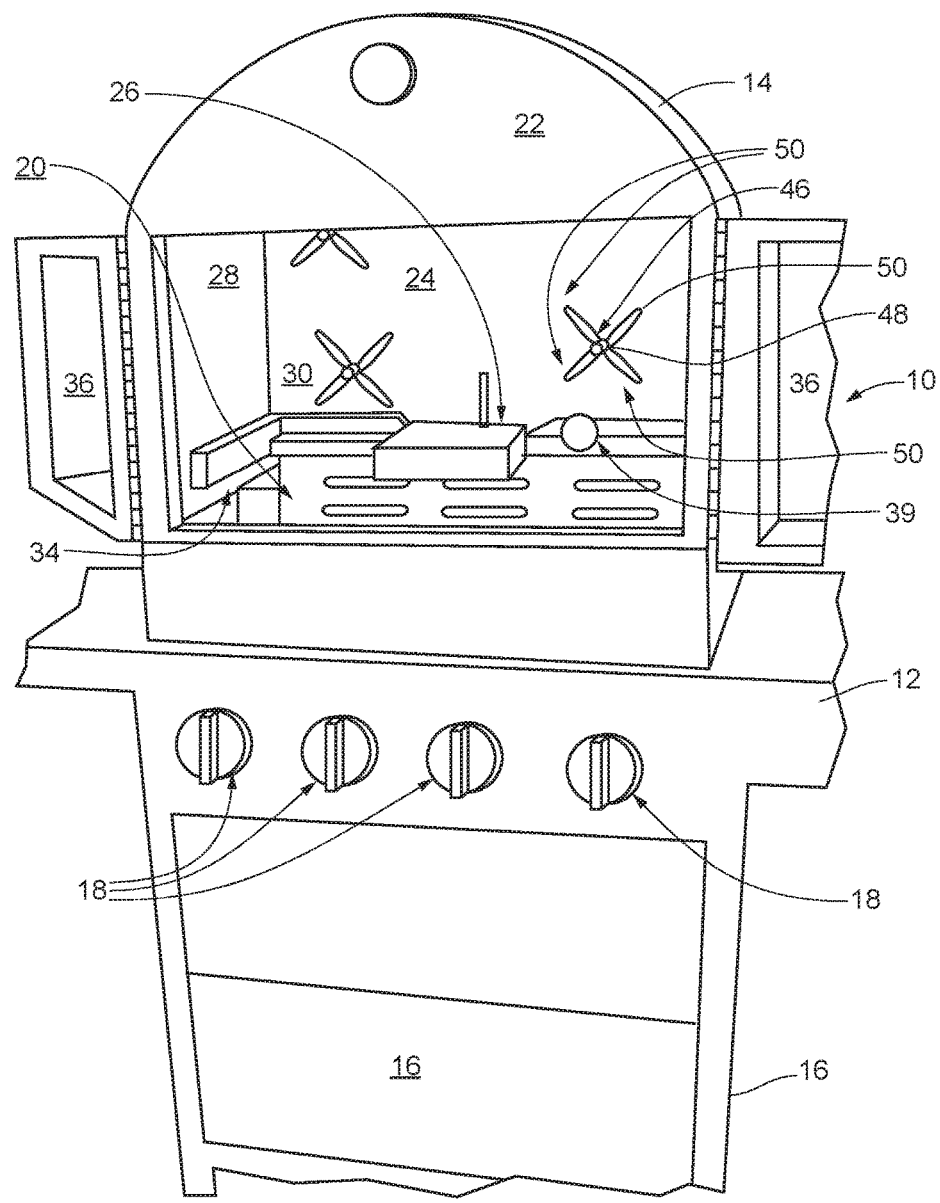
FIG. 1 is a perspective view of a grill and rotisserie apparatus according to an embodiment of the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

There is depicted in FIGS. 1-8 a rotisserie and grill apparatus 10 according to an embodiment of the present invention. As depicted in FIG. 1, rotisserie and grill apparatus 10 generally includes grill 12 and rotisserie apparatus 14. Grill 12 generally includes housing 16, and burner controls 18 controlling heat input to burners (not depicted) positioned under cooking surface 20. Although a propane gas grill 12 is depicted and described herein, it is to be understood that other types of common grill may be used as a heat source with the rotisserie apparatus described herein, including natural gas, charcoal, coal, and electric grills.

Rotisserie apparatus 10 generally includes hood portion 22, rotisserie wheel 24, and holding devices 26. Hood portion 22 generally includes sides 28, back 30, and top 32, defining an enclosure with a front opening 34, with doors 36 hinged to sides 28 and arranged to selectively close the front opening 34. Hood portion 22 can be fabricated from sheet metal or other suitably heat resistant material.

Rotisserie wheel 24 generally includes circular disk 36 and holding device mounting pins 38. Circular disk 36 is rotatably mounted to back 30 of hood portion 22. Circular disk 36 is driven in rotation by a selectively engageable power source (not depicted), which can be an electric motor. The power source can be directly coupled to circular disk 36 or through an indirect drive mechanism such as a chain or gear drive. Holding device mounting pins 38 are arranged proximate the circumferential edge of circular disk 36, and are generally evenly spaced at regular intervals. In an embodiment as depicted, holding device mounting pins 38 may be spaced at 60 degree intervals. Turning rollers 39 are mounted on back 30 adjacent the circumferential edge of circular disk 36.

As depicted in FIGS. 2-8, holding device 26 generally includes basket 40, lid 42, latch 44, and turning member 46. Lid 42 is hinged to basket 40 so as to enable selective access to food enclosure 46. Latch 44 is pivotally coupled to basket 40, and is shiftable between a disengaged position wherein lid 42 can be opened to insert or remove food from basket 40, and an engaged position wherein latch 44 retains lid 42 in place over basket 40. As depicted, basket 40 and lid 42 can be made from suitable heat resistant wire or metal grating material. Turning member 46 generally includes central axle portion 48 with radially projecting tines 50. Tines 50 can be spaced 90 degrees apart as depicted or at other intervals as may be desired for different turning intervals as further described herein below. Turning member 46 is rotationally fixed to basket 40, and axle portion 48 is rotationally received on one of device mounting pins 38 of rotisserie wheel 24.

Figure 2:
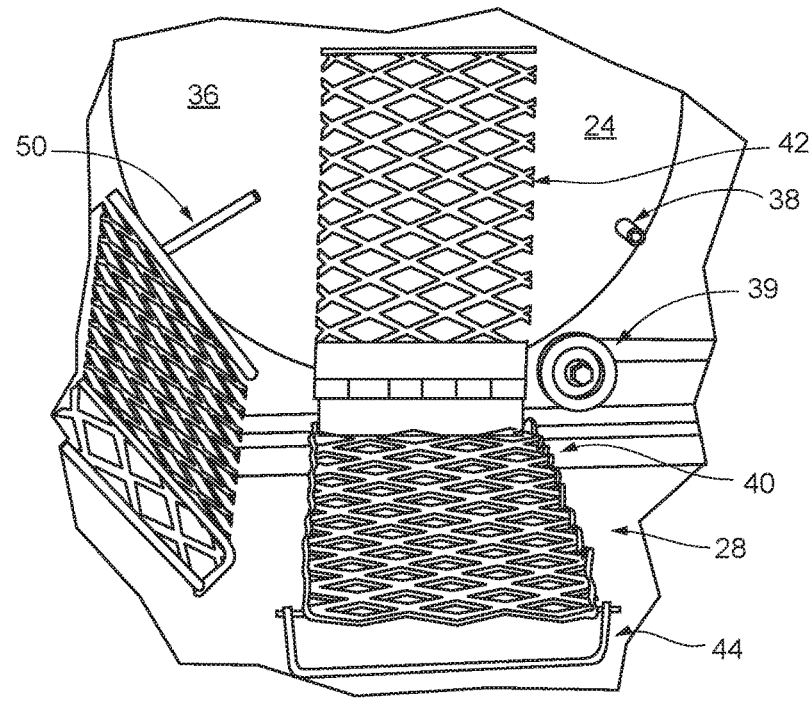
FIG. 2 is a perspective view of a holding device portion of a rotisserie apparatus according to FIG. 1, with the holding device depicted in an open position.
Figure 3:
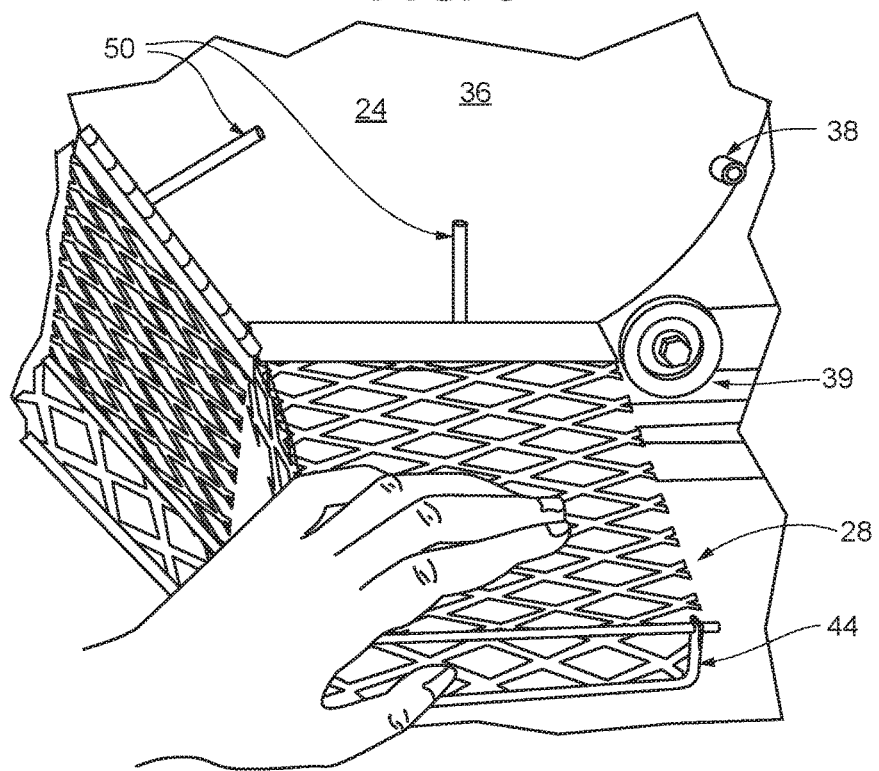
FIG. 3 is a perspective view of the holding device of FIG. 2, with the holding device in a closed position prior to latching.
Figure 4:
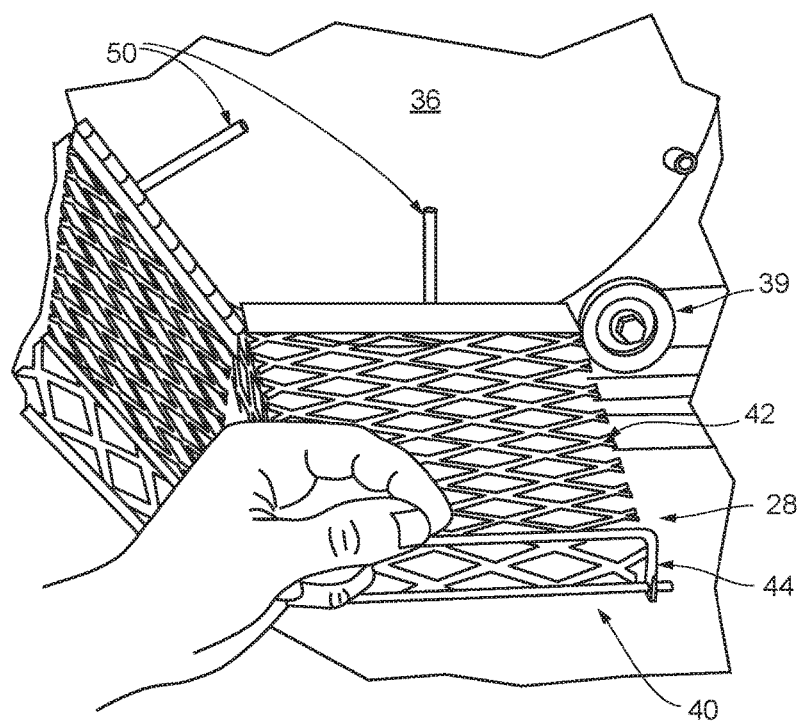
FIG. 4 is a perspective view of the holding device of FIG. 2, with the holding device in a closed position and latched.
Figure 5:
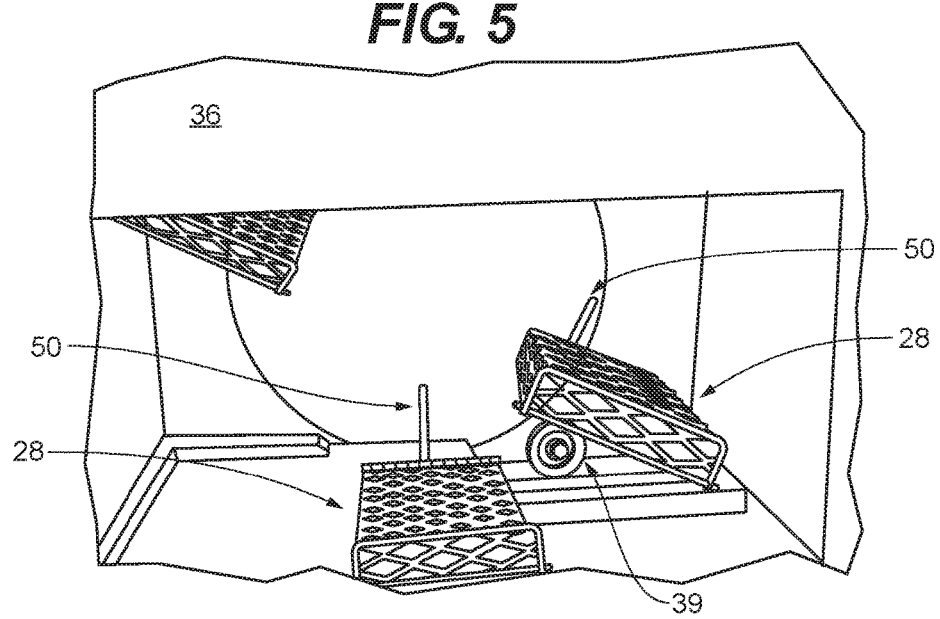
FIG. 5 is a perspective view of the rotisserie apparatus in operation at a point where one of the holding devices is at a point of rotation.
Figure 6:
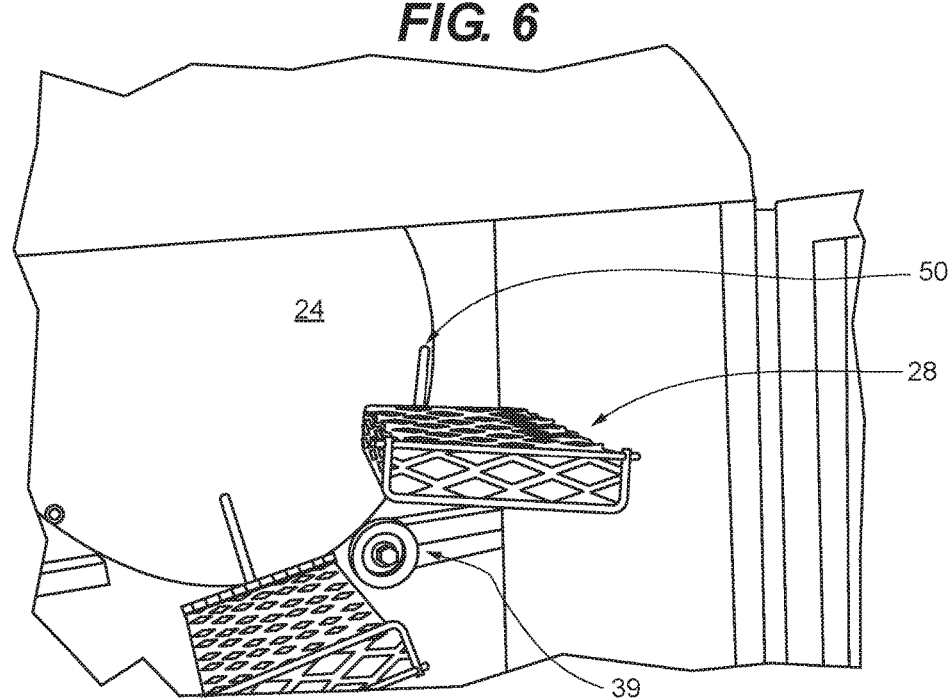
FIG. 6 is a perspective view of the rotisserie apparatus depicted in FIG. 5 in operation at a point after the holding device depicted therein has been rotated one-quarter turn.
Figure 7:
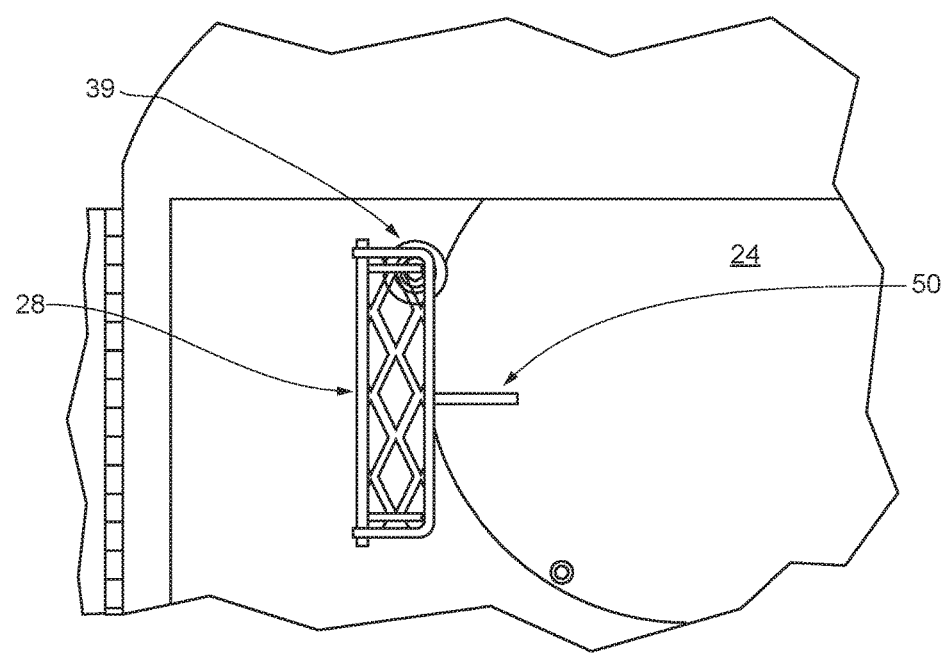
FIG. 7 is a perspective view of the rotisserie apparatus depicted in FIG. 5 in operation at a point after the holding device depicted therein has been rotated another one-quarter turn.
Figure 8:
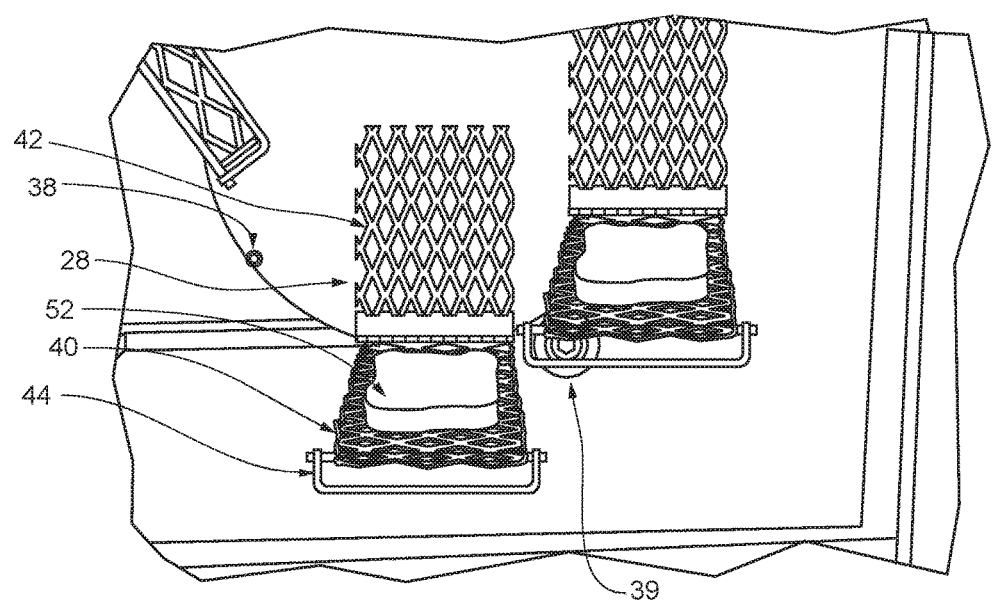
FIG. 8 depicts the rotisserie apparatus of FIG. 2 with a meat item received in the holding device and the lid of the holding device open.

In use, with lid 42 of holding device 26 open, meat 52 is placed in basket 40 as depicted in FIG. 8. Lid 42 is then closed, and latch 44 is secured as depicted in FIGS. 2-4. This process is repeated for each holding device 26 to be used in a grilling cycle. Each holding device 26 is then fitted on one of device mounting pins 38. The heat source of grill 12 is turned on, and rotisserie wheel 24 is set in rotation. As depicted in FIGS. 5-7, as rotisserie wheel 24 rotates, holding devices 26 pass turning rollers 39 in succession. As holding device 26 passes turning roller 39, one of tines 50 contacts turning roller 39. Tine 50 rides along turning roller 39, thereby imparting rotation to holding device 26. It will be appreciated that with tines 50 spaced at 90 degree intervals as depicted, holding device 26 will be rotated 90 degrees, or one-quarter turn. With two turning rollers 39 spaced apart along the circumferential edge of rotisserie wheel 24 and spaced 180 degrees apart as in the depicted embodiment, each holding device will be rotated 180 degrees per rotation of rotisserie wheel 24. Thus, each side of meat 52 will pass over cooking surface 20 once for every two rotations of rotisserie wheel 24. It will also be appreciated that with holding device mounting pins 38 spaced at 90 degree intervals, holding devices 26 will be vertically registered for a significant portion of the rotation of rotisserie wheel 24, thereby enabling any juices from the cooking of meat 52 to drop from the upper holding devices 26 to the lower holding devices 26. It will further be appreciated that, by varying the number of tines 50 and/or the number of turning rollers 39, different degrees of rotation can be achieved for holding devices 26 if desired. Once meat 52 has reached the desired degree of doneness, rotisserie wheel 24 can be stopped, holding devices 26 removed from device mounting pins 38, and lid 42 of each holding device opened by first moving latch 44 to the disengaged position, and then swinging lid 42 open. Meat 52 can then be removed from basket 40.

Figure 9:
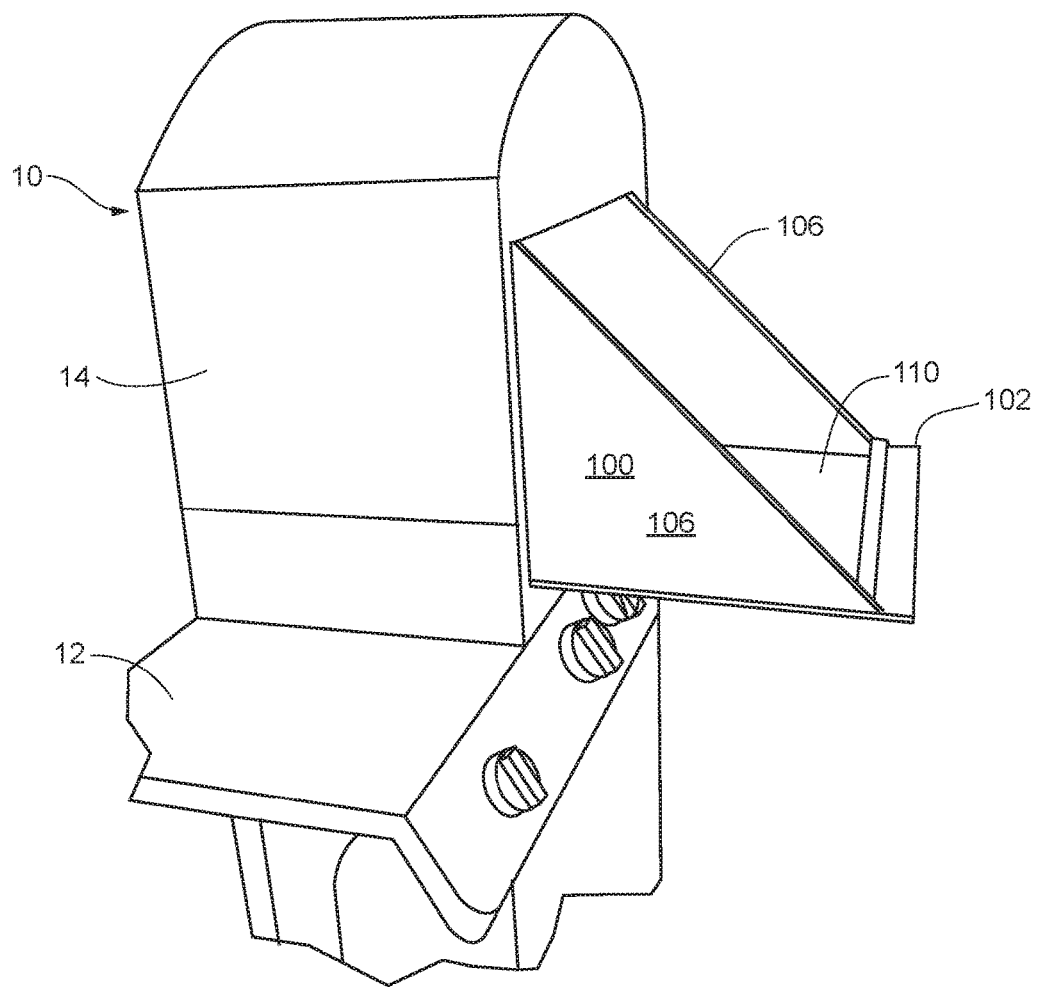
FIG. 9 depicts an alternative embodiment of the invention in which the front door of the rotisserie housing is a downwardly swinging door.
Figure 10:
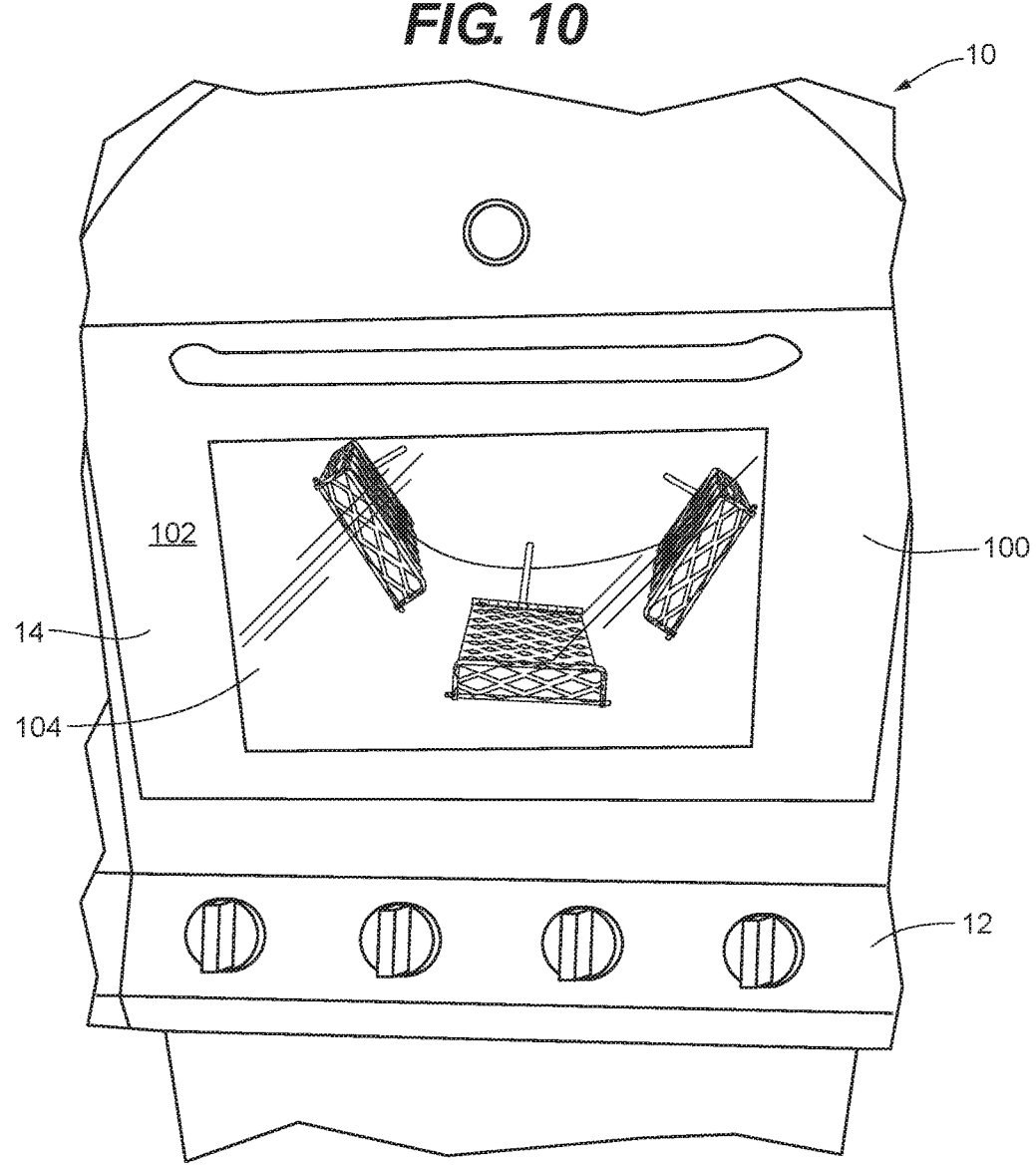
FIG. 10 is a front view of the embodiment of FIG. 9 in which the door is in a closed position.
Figure 11:
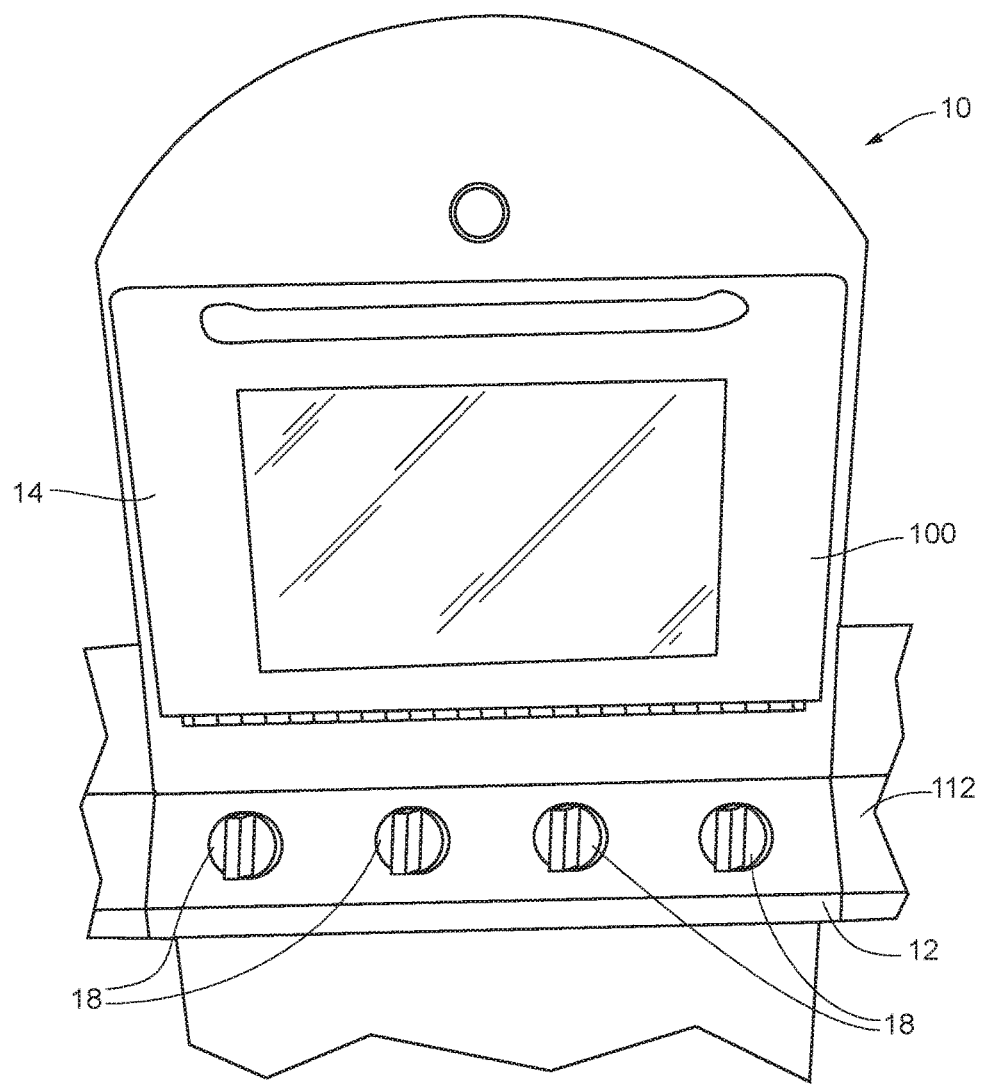
FIG. 11 is another front view of the embodiment of FIG. 9.

In FIGS. 9-11 there is depicted another embodiment of the grill and rotisserie apparatus of the present invention, in which doors 36 of rotisserie apparatus 14 are replaced with a downwardly swinging door assembly 100. Door assembly 100 generally includes front panel 102, which may include window 104, and side panels 106. Front panel 102 is coupled to hood portion 22 by hinge 108. It will be appreciated that with front panel 102 in the open position as depicted in FIG. 9, the inside surface of front panel 102 presents a surface 110, that can be used for receiving plates or utensils for tending or serving the meat 52 either before or after cooking. In FIG. 11 there is also depicted a switch 112 for turning on and off the power source driving rotation of rotisserie wheel 24.

The embodiments above are intended to be illustrative and not limiting. Additional embodiments are within the scope of the claims. In addition, although aspects of the present invention have been described with reference to particular embodiments, those skilled in the art will recognize that changes can be made in form and detail without departing from the spirit and scope of the invention, as defined by the claims.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as understood by persons of ordinary skill in the art.

For purposes of interpreting the claims for the present invention, it is expressly intended that the provisions of Section 112(f) are not to be invoked unless the specific terms "means for" or "step for" are recited in a claim.

What is claimed is:

1. A grill for cooking food items, comprising:
    a heat source; and
    a rotisserie disposed above the heat source, the rotisserie including:
        a substantially circular wheel rotatable about a horizontal axis, the wheel having a periphery;
        a pair of turning structures mounted proximate the periphery of the wheel, the turning structures spaced apart by 180 degrees of rotation of the wheel, wherein each turning structure is a roller;
        a power source operably coupled to the wheel and arranged to rotate the wheel about the horizontal axis; and
        a plurality of food holding devices rotatably coupled to the wheel proximate the periphery of the wheel, the rotation of each food holding device being about a horizontal axis parallel to the horizontal axis of the wheel, and each food holding device having a plurality of radially projecting tines, wherein when the wheel is rotated by the power source, the tines of the food holding devices successively engage the turning structures so as to rotate each food holding device one-quarter turn relative to the horizontal axis of the food holding device for each time the food holding device passes one of the turning structures.

2. The grill of claim 1, wherein the power source is an electric motor.

3. The grill of claim 1, wherein the food holding devices comprise a basket and a lid, the lid being operably coupled to the basket.

4. The grill of claim 1, wherein the grill comprises a housing, and wherein the housing has an opening on one side thereof, and a selectively shiftable door operably coupled thereto to close the opening.

5. The grill of claim 4, wherein the selectively shiftable door comprises a downwardly swinging door assembly.

6. The grill of claim 1, wherein the wheel presents a plurality of device holding pins, and wherein each of the food holding devices is detachably engaged with a separate one of the device holding pins.

7. A rotisserie apparatus for mounting over a heat source to cook food items, comprising:
    a housing;
    a substantially circular wheel mounted in the housing, the wheel rotatable about a horizontal axis, the wheel having a periphery;
    a pair of turning structures mounted on the housing proximate the periphery of the wheel, the turning structures spaced apart by 180 degrees of rotation of the wheel, wherein each turning structure is a roller;
    a power source operably coupled to the wheel and arranged to rotate the wheel about the horizontal axis; and
    a plurality of food holding devices rotatably coupled to the wheel proximate the periphery of the wheel, rotation of each food holding device being about a horizontal axis parallel to the horizontal axis of the wheel, and each food holding device having a plurality of projections, wherein when the wheel is rotated by the power source, the projections of the food holding devices successively engage the turning structures so as to rotate each food holding device relative to the horizontal axis of the food holding device each time the food holding device passes one of the turning structures.

8. The rotisserie apparatus of claim 7, wherein the power source is an electric motor.

9. The rotisserie apparatus of claim 7, wherein the food holding devices comprise a basket and a lid, the lid being operably coupled to the basket.

10. The rotisserie apparatus of claim 7, wherein the housing has an opening on one side thereof, and a selectively shiftable door operably coupled thereto to close the opening.

11. The rotisserie apparatus of claim 10, wherein the selectively shiftable door comprises a downwardly swinging door assembly.

12. The rotisserie apparatus of claim 7, wherein the wheel presents a plurality of device holding pins, and wherein each of the food holding devices is detachably engaged with a separate one of the device holding pins.

13. A grill for cooking food items, comprising:
a heat source; and
a rotisserie disposed above the heat source; the rotisserie including:
   a housing;
   a substantially circular wheel in the housing, the wheel rotatable about a horizontal axis, the wheel having a periphery;
   a plurality of turning structures mounted proximate the periphery of the wheel, wherein each turning structure is a roller;
   a power source operably coupled to the wheel and arranged to rotate the wheel about the horizontal axis; and
   a plurality of food holding devices rotatably coupled to the wheel proximate the periphery of the wheel, the rotation of each food holding device being about a horizontal axis parallel to the horizontal axis of the wheel, and each food holding device having a plurality of radially projecting tines, wherein when the wheel is rotated by the power source, the tines of the food holding devices successively engage the turning structures so as to rotate each food holding device relative to the horizontal axis of the food holding device for each time the food holding device passes one of the turning structures.

14. The grill of claim 13, wherein the turning structures are spaced apart by 180 degrees of rotation of the wheel.

15. The grill of claim 14, wherein the food holding device has four tines arranged in a cruciform shape.

16. The grill of claim 13, wherein the food holding devices comprise a basket and a lid, the lid being operably coupled to the basket.

17. The grill of claim 13, wherein the housing has an opening on one side thereof, and a selectively shiftable door operably coupled thereto to close the opening.

18. The grill of claim 17, wherein the selectively shiflahie door comprises a downwardly swinging door assembly.

* * * * *

UNITED STATES PATENT AND TRADEMARK OFFICE
CERTIFICATE OF CORRECTION

PATENT NO. : 9,854,938 B2  
APPLICATION NO. : 14/727077  
DATED : January 2, 2018  
INVENTOR(S) : Don Jellis Page 1 of 1

It is certified that error appears in the above-identified patent and that said Letters Patent is hereby corrected as shown below:

In the Claims

Column 8, Line 17:
Delete "shiflahie" and insert --shiftable--.

Signed and Sealed this
Eleventh Day of June, 2019

Andrei Iancu
*Director of the United States Patent and Trademark Office*